United States Patent [19]
Tosaka et al.

[11] Patent Number: 4,710,008
[45] Date of Patent: Dec. 1, 1987

[54] CAMERA WITH OPERATION SWITCH

[75] Inventors: Yoichi Tosaka; Masami Shimizu, both of Tokyo, Japan

[73] Assignee: Canon Kabushiki Kaisha

[21] Appl. No.: 940,175

[22] Filed: Dec. 10, 1986

Related U.S. Application Data

[63] Continuation of Ser. No. 681,021, Dec. 13, 1984, abandoned.

[30] Foreign Application Priority Data

| Dec. 15, 1983 | [JP] | Japan | 58-192130[U] |
| Dec. 15, 1983 | [JP] | Japan | 58-192131[U] |
| Dec. 27, 1983 | [JP] | Japan | 58-199064[U] |
| Dec. 27, 1983 | [JP] | Japan | 58-199065[U] |

[51] Int. Cl.$^4$ .................. G03B 17/02; G03B 7/00
[52] U.S. Cl. .................. 354/289.1; 354/475; 354/486
[58] Field of Search ............ 354/412, 475, 486, 289.1, 354/289.12

[56] References Cited

U.S. PATENT DOCUMENTS

| 4,286,849 | 9/1981 | Uchidoi et al. | 354/475 |
| 4,304,482 | 12/1981 | Suzuki et al. | 354/289.1 |
| 4,344,681 | 8/1982 | Yamada | 354/475 |
| 4,461,560 | 7/1984 | Yoshino et al. | 354/475 |
| 4,483,601 | 11/1984 | Sekida et al. | 354/289.1 |
| 4,525,054 | 6/1985 | Someya et al. | 354/289.1 |
| 4,529,291 | 7/1985 | Mizogui | 354/289.1 |
| 4,538,891 | 9/1985 | Matsuyama et al. | 354/289.1 |

*Primary Examiner*—Russell E. Adams
*Attorney, Agent, or Firm*—Toren, McGeady & Associates

[57] ABSTRACT

In the disclosed camera, an operation switch for entering information or controlling a function has an information setting button disposed on the camera's upper surface near the shutter release button. An externally directed display behind the information setting button indicates photographic information set by the information setting button.

31 Claims, 7 Drawing Figures

CAMERA WITH OPERATION SWITCH

This is a continuation of application Ser. No. 681,021, filed Dec. 13, 1984 now abandoned.

BACKGROUND OF THE INVENTION

1. Field of the Invention

This invention relates to cameras, and particularly cameras with an operation switch for performing an information setting or function controlling operation.

2. Description of the Prior Art

In many conventional cameras, photographic information is set with a dial provided with a built-in sliding resistor or a substrate having a four or five bit patternized code. Setting a film sensitivity value, for example, involves adjusting the position of the dial, which is intermittently marked with ASA/ISO value figures 100, 125, 200, 250, 400, etc., to a specific value. Such conventional setting devices require a complex arrangement of the component parts of the dial. Additionally, operation of the dial is quite difficult when an information display system is arranged within a view finder, because the dial must be operated while watching the display within the view finder.

To solve this problem, a proposal has been made for a setting device with an up button and a down button arranged such that either the up button or the down button is continuously depressed depending on whether the presently displayed setting value should be increased or decreased. The up or down buttons are released when a desired setting value is displayed. This provides a simple setting device. However, since the setting value display system is still arranged with the view finder, together with other photographic information, the display cannot be easily discerned. Besides, the operability of the device is still poor because the up or down button must be operated while watching the inside of the view finder.

Figure 1A:
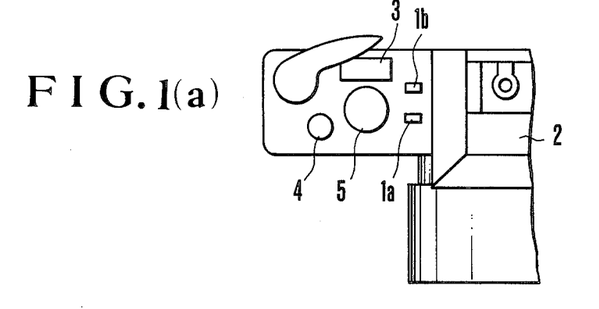
FIGS. 1(a) and 1(b) are plan views showing a portion of a conventional camera body.
Figure 1B:
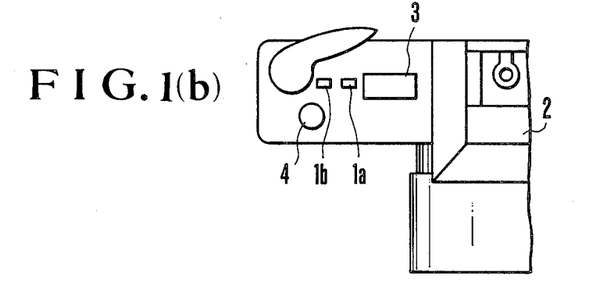

Cameras have been contrived with a display device such as a liquid crystal or light emitting diode display device disposed on the outside of the camera, as shown in FIGS. 1(a) and 1(b) of the accompanying drawings. In the camera represented by FIG. 1(a), an up-shifting button 1a and a down-shifting button 1b are vertically aligned along one side of a camera part 2 having a pentagonal prism disposed therein. A display device 3, a shutter release button 4 and a photographing mode selection dial 5 are arranged on one side of the up- and down-shifting buttons 1a and 1b. In the camera represented by FIG. 1(b), the up button 1a and the down button 1b are laterally aligned behind the shutter release button 4. The display device 3 is disposed on the side of the pentagonal prism part 2.

The operability of the cameras shown in FIGS. 1(a) and 1(b) has not been satisfactory. The camera shown in FIG. 1(a) requires the camera operator to shift his or her manner of holding the camera for taking a photograph to a different manner of holding for a photographic information setting operation. Furthermore, the operating finger tends to obstruct the view of the display device 3 and the photographing mode selection dial 5 tends to hinder the setting operation. In the camera shown in FIG. 1(b), the button 1a and 1b must be operated by bending an index finger, because they are located behind the shutter release button 4. This location is also disadvantageous in terms of operating the camera.

Another problem with the prior art arrangements shown in FIGS. 1(a) and 1(b) is that the up- or down-shifting buttons 1a or 1b are apt to be inadvertently operated while the camera is being carried by the photographer. Further, since the two setting shift buttons 1a and 1b are arranged within a small limited space on the upper surface of the camera, they are inevitably small and located near each other. Therefore, it is highly probable that the photographer will mistake one of them for the other or inadvertently operate both. In that event, the setting value of photographic information is shifted downward and upward contrary to the intention of the photographer. The possibility of such mis-operation is especially salient where the up-shifting and down-shifting buttons 1a and 1b are laterally arranged, as shown in FIG. 1(1). In other words, when the photographer attempts to operate the button 1a, which is located farther from the operating finger of the photographer, it is quite likely that the other button 1b located closer to the finger will be erroneously operated together with the farther button 1a (located on the side of the optical axis of the photo-taking lens of the camera).

Further, according to the prior art shown in FIG. 1(a) and 1(b), the up-shifting or down-shifting buttons 1a and 1b are pushed down while a light measurement start switch is turned on. However, in a conventional camera, the first half-stroke in the depression of the shutter release button 4 is what turns on the light measurement start switch. The shutter is released by the second half-stroke of the shutter-button depression. With either of the prior art arrangements applied to the conventional camera, two fingers of one hand gripping the camera must be used for operating two buttons. While the shutter release button 4 is pushed down through the first half-stroke with, for example, an index finger, the up-shifting or down-shifting button 1a or 1b must be pushed with another finger of the same hand. Then during that operation, which is performed with the same hand, the shutter release button 4 is apt to be erroneously pushed down for the second half-stroke. These prior art constructions thus present a problem in terms of simplicity of operation.

SUMMARY OF THE INVENTION

It is an object of the present invention to provide an operation switch for a camera which gives improved operability for setting photographic information.

The above and further objects and features of the invention will become apparent from the following detailed description of preferred embodiments thereof taken in connection with the accompanying drawings.

DETAILED DESCRIPTION OF THE PREFERRED EMBODIMENTS

Figure 2:
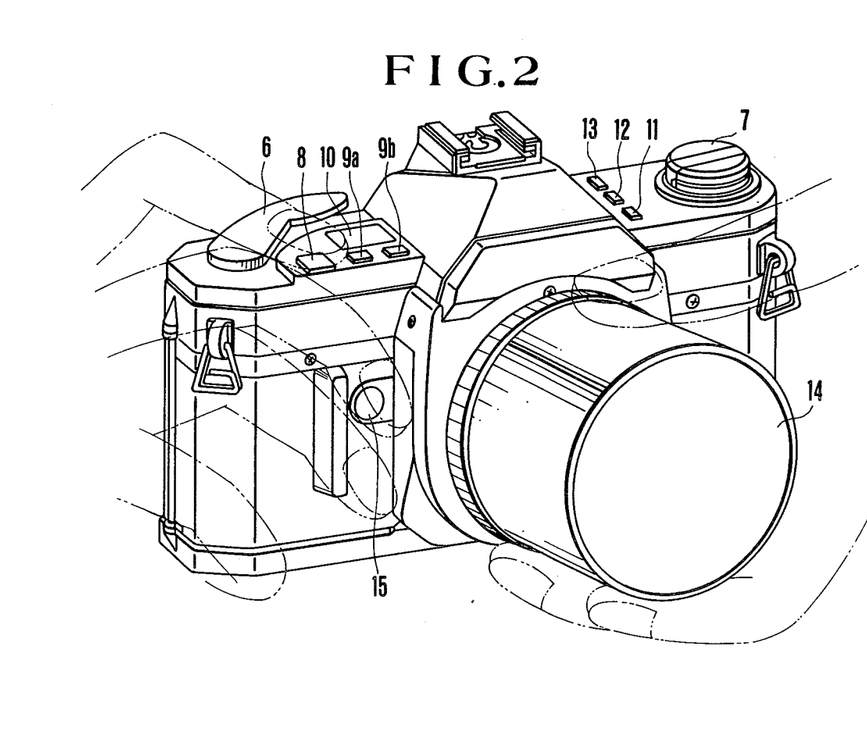
FIG. 2 is a perspective view showing a camera as an embodiment of this invention.

An embodiment of this invention is shown in FIGS. 2 to 5. Of these drawings, FIG. 2 is a perspective view showing the appearance of a camera body. The camera is provided with a film winding lever 6 and a film rewinding knob 7 which are disposed at two ends on the upper part of the camera. On the side of the body carrying the winding lever 6, a known shutter release button 8 turns on a light measurement start switch when depressed a first half stroke and turns on a shutter release switch when further depressed a second half stroke. The side of the body with the winding lever 6 also includes an up-shift button 9a, a down-shift button 9b and a display window 10. The up-shift button 9a and the down-shift button 9b are laterally arranged side by side approximately in line with the shutter release button 8. The side of the body with the film rewinding knob 7 includes a photographic mode selection button 11, a film sensitivity selection button 12 and a battery voltage check button 13 which are "vertically" aligned one after another. One can select and set the desired photographing mode by pushing either the up-shift button 9a or down-shift button 9b disposed in front of the display window 10, to the side of a photo-taking lens 14, while pushing the photographic mode selection button 11.

The front of the camera body carries a light measurement start button 15 which is positioned to be touched naturally by the middle finger of the right hand when the photographer holds the camera. When this button 15 is pushed, a switch operating in the same manner as a known light measurement start switch in response to the first half stroke of the shutter release button 8 is now actuated. A circuit arrangement for starting the light measurement is well known and does not require detailed description herein.

Figure 3:
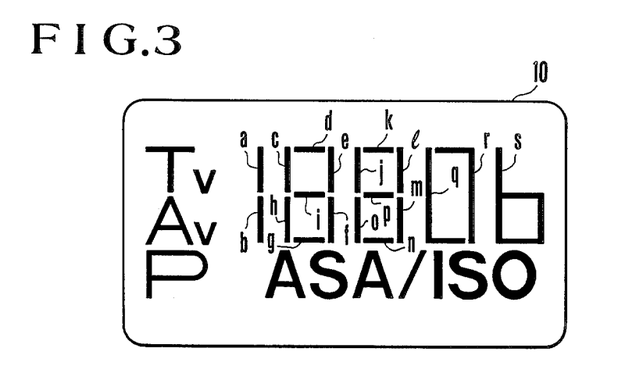
FIG. 3 is a plan view showing a liquid crystal display device fully lit, and disposed within a display window of the camera body shown in FIG. 2.

FIG. 3 shows a liquid crystal display device disposed within the display window 10 of FIG. 2. The illustration shows the liquid crystal display device in a fully lit state. The display device lights up to display "Tv" when a shutter priority mode is selected; "Av" when an aperture priority mode is selected; and "P" when a program mode is selected. With a film sensitivity value set, the display device lights up to display "ASA/ISO" together with one of the film sensitivity information values 100, 200, 400, etc., which is displayed with segments c to r lit. The display device can also display shutter time information values including a bulb time, 2 sec., 1/250 sec., 1/1000 sec., etc. by lighting up segments a to 2.

Figure 4:
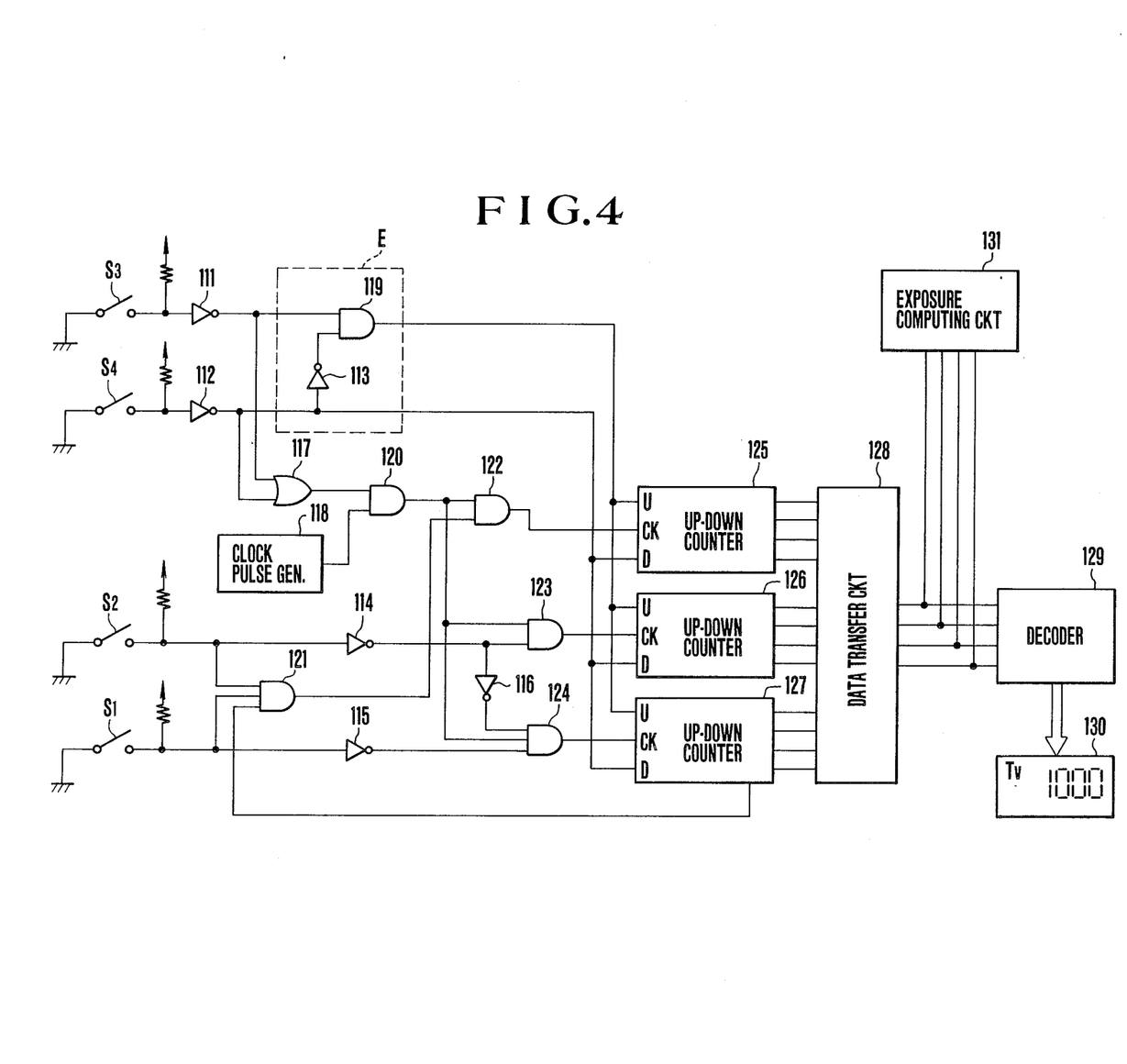
FIG. 4 is a circuit diagram showing a circuit arrangement of an embodiment of this invention.

FIG. 4 shows the circuit arrangement of the embodiment of this invention. A switch S1 turns on when the photographing mode selection button 11 is pushed. A switch S2 turns on when the film sensitivity value selection button 12 is depressed. A switch S3 turns on when the up-shift button 9a is depressed. Another switch S4 is arranged to turn on when the down-shift button 9b is depressed. The circuit arrangement includes inverters 111 to 1116; or OR gate 117 which receives signals from the inverters 111 and 112; a clock pulse generator 118; and an AND gate 119 which receives a signal from the switch S3 via the inverter 111 at one of its input terminals and receives a signal from the switch S4 via the inverters 112 and 113 at its other input terminal. A preference circuit E is formed by the AND gate 119 and the inverter 113. An AND gate 120 receives signals from the OR gate 117 and the clock pulse generator 118. An AND gate 121 is arranged to receive signals from the switches S1 and S2. The circuit further includes AND gates 122 and 123. A three-input AND gate 124 is arranged to receive signals from the inverters 115 and 116 and the AND gate 120. An up-down counter 125 stores information concerning shutter time values including a bulb time, 2 sec., 1 sec., 1 sec., ½ sec., - - -, 1/30 sec., 1/60 sec., 1/125 sec., 1/500 sec., and 1/1000 sec. The up-down counter up-counts every time a clock pulse is received at a clock input terminal CK while an up-count terminal is receiving a high level signal. Then, the shutter time value changes to a higher shutter speed value. The counter counts down every time a clock pulse is received while a high level signal is being supplied to a down-count terminal D thereof. In that event, the shutter time value changes to a lower shutter speed value. An up-down counter 126 stores film sensitivity information values including 100, 125, 200, 250 and 400. Another up-down counter 127 is arranged to store photographic mode information including a shutter priority mode Tv, an aperture priority mode Av and a program mode P. The up-down counter 127 produces a high level signal from its output terminal T when the shutter priority mode is selected. A data transfer circuit 128 is arranged to transfer the information outputs of the up-down counters 125, 126 and 127 to a liquid crystal display device 130 via a decoder 129 or to an exposure computing circuit 131 as applicable.

The circuit arrangement of the embodiment operates as follows: In setting a photographic mode, the desired mode can be selected by depressing either the up-shift button 9a or down-shift button 9b while depressing the photographic mode selection button 11. With the photographic mode selection button 11 depressed, the switch S1 turns on. A high level signal is supplied via the inverter 115 to one of the input terminals of the AND gate 124. Meanwhile, with the up-shift button 9a depressed, the switch S3 turns on. A high level signal is then supplied via the inverter 111 and the OR gate 117 to one of the input terminals of the AND gate 120. This high level signal causes the AND gate 120 to transfer the clock pulse from the clock pulse generator 118 to another AND gate 124. At that instant, since the switch S2 remains off, a high level signal is also supplied to the other input terminal of the AND gate 124 via the inverters 114 and 116. Therefore, the AND gate 124 allows the clock pulse supplied from the AND gate 120 to be supplied as it is to the clock input terminal CK of the up-down counter 127.

With the switch S3 turned on as mentioned, a high level signal is supplied via the inverter 111 to one of the input terminals of the AND gate 119. At that time, since the switch S4 remains off, a high level signal is also supplied via the inverters 112 and 113 to the other input terminal of the AND gate 119. The output of the AND gate 119 thus becomes a high level signal, which is then supplied to the up-count terminal U of each of the up-down counters 125, 126, 127. Therefore, the up-down counter 127 up-counts every time a clock pulse comes from the AND gate 124. In other words, photographic mode information which is produced from the up-down counter 127 shifts from one mode to another in the following manner: The shutter priority mode→aperture priority mode→program mode→shutter priority mode→ - - - . Then, the count contents (the photographing mode information) are supplied via the data transfer circuit 128 and the decoder 129 one after another to the liquid crystal display device 130. The liquid crystal display device 130 displays these modes Tv, Av, and P one after another. The photographer stops depressing the up-shift button 9a when the desired photographic mode is obtained. Then, the output of the AND gate 124 goes low. The up-counting action of the up-down counter 127 comes to an end and the camera is set in the desired photographing mode. If, in this operation, the down shift button 9b is depressed instead of the up-shift button 9a, the switch S4 turns on and the photographic mode information shifts in reverse in the following manner: The shutter priority mode Tv→program mode P→aperture priority mode Av→shutter priority mode Tv→ - - - .

In setting the film sensitivity value, the up-shift or down-shift button 9a or 9b is depressed while depressing the film sensitivity value selection button 12. With the film sensitivity value selection button 12 depressed, the switch S2 turns on. A high level signal is supplied via the inverter 114 to one of the input terminals of the AND gate 123. Meanwhile, with the up-shift button 9a depressed, for example, the switch S5 turns on in the same manner as mentioned above. A clock pulse then travels via the AND gate 120 to the other input terminal of the AND gate 123. The AND gate 123 then passes the clock as it is from the AND gate 120 to the clock input terminal CK of the up-down counter 126.

With the switch S3 turned on, a high level signal is supplied to the up-count terminal U of the up-down counter 126 in the same manner as mentioned in the foregoing. Therefore, the up-down counter 126 counts up every time a clock pulse is received from the AND gate 123. In other words, the film sensitivity information produced from the up-down counter 126 increases in ASA/ISO value as follows: 100→125→200→250→400. If the down-shift button 9b is depressed instead of the up-shift button 9a, the setting ASA/ISO value decreases as follows: 400→250→200→125→100. The photographer stops depressing the up-shift button 9a or the down-shift button 9b when the desired film sensitivity value is obtained. Assuming that the desired film sensitivity value is ASA/ISO 250, the liquid crystal display device 130 then displays letters "ASA/ISO" denoting film sensitivity. At the same time, segments d, e, i, h, and g which jointly depict the hundredth digit 2, segments k, j, p, m, and l which jointly depict the tenth digit 5 and segments g and r which depict the unit digit 0 respectively light up to show "250". The display enables the photographer to see it from the display window 10 for confirmation of film sensitivity setting value. After completion of film sensitivity setting, the displayed letters ASA/ISO and the displayed film sensitivity setting value "250" both disappear from the liquid display device 130 when the photographer stops depressing the film sensitivity value selection button 12.

In the photographic mode information setting operation mentioned in the foregoing, if the shutter priority mode is selected by the setting operation, the camera is set in the priority mode. In this case, the liquid crystal display device displays letters Tv and digits "250", for example, representing a previously selected shutter time value of 1/250 sec. Also, in this case, the up-down counter 127 produces a high level signal from its output terminal T. This high level signal is supplied to one of the input terminals of the AND gate 121. At that time, since both the switches S1 and S2 remain off, two other input terminals of the AND gate 121 receive high level signals. The output of the AND gate 121 thus becomes a high level signal. Then, if the up-shift button 9a is depressed under this condition, the switch S3 turns on. The AND gate 120 then produces the clock pulse received from the clock pulse generator 118 as it is in the same manner as previously mentioned. This clock pulse arrives at the other input terminal of the AND gate 122. The AND gate 122 supplies the clock pulse received from the AND gate 120 to the clock input terminal CK of the up-down counter 125 as it is.

With the up-shift button 9a operated, a high level signal is supplied to the up-count terminal U of the up-down counter 125. Therefore, the up-down counter 125 counts up every time a clock pulse is received from the AND gate 122. In other words, the shutter time information produced from the up-down counter 125 shifts to a higher speed time value, for example, in the following manner 1/250 sec.→1/500 sec.→ 1/1000 sec. In the event that the down-shift button 9b is depressed instead of the button 9a, the shutter time information shifts to a lower shutter speed time value, for example, in the following manner: 1/250 sec.→1/125 sec.→ - - - ½ sec.→1/sec.→2 sec. After the shutter time of 2 sec. comes a bulb time for a bulb exposure. In the event of 2 sec., the segments d, e, i, h, and g and segments j and l of the liquid crystal display device 130 light up to display a reading such as "2". In the event of bulb control, the segments c, h, i, f, and g, segments o, n, and m, the segment q and another segment s respectively light up to make a display reading "bulb".

Meanwhile, another display device of two figures each consisting of seven segments is provided within the view finder though it is not shown in the drawing. When either the light measurement start button 15 is depressed or the shutter release button 8 is depressed the first half stroke, the display device displays an aperture value computed by the exposure computing circuit 131 according to the set photographic mode.

Let us now assume that, with the photographic mode set at the shutter priority mode Tv, the photographer holds the camera for photography in a manner indicated by two-dot chain lines in FIG. 2 after setting the film sensitivity and shutter time values. The operation buttons are located in positions such that, under the above-stated condition, the index finger of the right hand of the photographer naturally rests on the shutter release button 8 while the middle finger naturally rests on the light measurement start button 15. When either the shutter release button 8 is now depressed through the first half of its stroke, or the light measurement start button 15 is depressed, the exposure computing circuit 131 begins to operate. A computed aperture value thus obtained is displayed by the display device which is disposed within the view finder. In the case of the shutter priority mode Tv, however, the aperture tends to come within an excessive or insufficient brightness warning range as the range of aperture value is limited. In some cases, the photographer does not like the computed aperture value. In such cases, the photographer naturally changes the shutter time setting value while watching the aperture value displayed within the view finder. On that occasion, the photographer changes the preset shutter time value by depressing either the up-shift button 9a or the down-shift button 9b with the index finger of the right hand until a desired aperture value is obtained while depressing the light measurement start button 15 with the middle finger of the right hand and while watching the display within the view finder. However, when depressing the down-shift button 9b which is near to the photo-taking lens 14 and is less easy to manipulate, the up-shift button 9a might be depressed together with the button 9b with the button 9a unintentionally touched by a part of the index finger.

With the up-shift and down-shift buttons 9a and 9b simultaneously depressed, both the switches S3 and S4 turn on. With the switch S3 turned on, the output of the inverter 111 changes to a high level signal. Then, the high level signal arrives at one of the input terminals of the AND gate 119. Since another switch S4 is also on at that time, a low level signal is supplied via the inverters 112 and 113 to the other input terminal of the AND gate 119. Meanwhile, the output of the inverter 112 becomes a high level signal with the switch S4 turned on. This high level signal reaches the down-count terminal D of each of the up-down counters 125, 126, and 127. Therefore, with the up-shift and down-shift buttons 9a and 9b simultaneously depressed, the down-shift button 9b which is located closer to the optical axis of the photo-taking lens 14 has priority over the up-shift button 9a. Then, each of the up-down counters 125 to 127 thus begins to down-count every time a clock pulse is received from the AND gate 122, 123, or 124.

In this embodiment of the invention, the preference circuit E serves as preference effecting arrangement which represents one of the features of this invention. The up-shift and down-shift buttons 9a and 9b which serve as information setting buttons thus operate under the influence of this preference circuit E.

Figure 5:
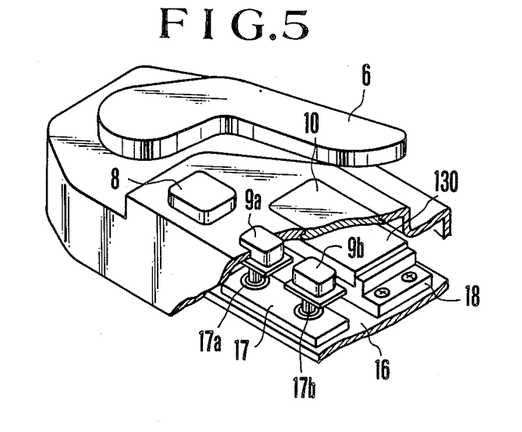
FIG. 5 is a partial cut-away view showing, by way of example, the structural arrangement of up-shift and down-shift buttons and the liquid crystal display device shown in FIG. 2.

FIG. 5 is a partially cut-away view showing the structural arrangement of the up-shift and down-shift buttons, the liquid crystal display device and parts in association with them. In FIG. 5, a wiring substrate 16 which is secured to the camera body has a conductive rubber piece 17 secured thereto. The up-shift and down-shift buttons 9a and 9b are disposed on projections 17a and 17b which protrude from the conductive rubber piece 17. The projections 17a and 17b are elastic and flexibly act when each of the up-shift and down-shift buttons 9a and 9b is depressed. The projections 17a and 17b thus serve as a switch to interconnect two conductor patterns (not shown) which are provided on the wiring substrate 16 and are normally not connected to each other by coming into contact simultaneously with them when the buttons 9a or 9b is depressed. The liquid crystal display device 130 is secured to the wiring substrate 16 via a holder 18 and is arranged to permit visual confirmation of the result of a setting operation through the display window 10.

In setting the photographic mode, the up-shifting button 9a is depressed while the photographic mode setting button 11 is also depressed. With the up-shift button 9a depressed, the projection 17a of the conductive rubber piece 17 is flexibly deformed downward and thus comes into contact with the two conductor patterns (not shown) which are normally not connected to each other. This interconnects the two patterns. As a result of this, the photographic mode shifts from one mode to another in the following manner: Shutter priority mode→aperture priority mode→program mode→shutter priority mode→ - - - . The liquid crystal display device 130 which is disposed within the display window 10 then lights up to make a display as follows: Tv→Av→P→Tv→ - - - . The camera can be set in a desired photographic mode when the photographer stops depressing the up-shift button 9a the instant the desired mode is displayed. In case the down-shift button 9b instead of the up-shift button 9a is depressed in setting the photographic mode, the projection 17b of the conductive rubber piece 17 is flexibly deformed downward to interconnect the two conductor patterns (not shown) which are normally not connected to each other. The photographic mode in this event shifts in reverse order as follows: Shutter priority mode Tv→program mode P→aperture priority mode Av→ shutter priority mode Tv→ - - - .

In setting the film sensitivity value, either the up-shift or down-shift button 9a or 9b is depressed while the film sensitivity value selection button 12 is pushed.

Figure 6:
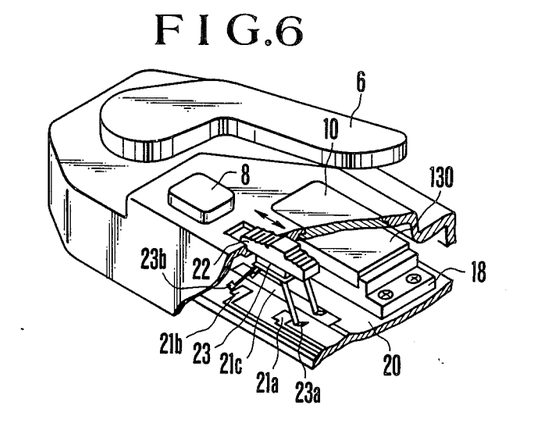
FIG. 6 is a partial cut-away view showing the operation part of a camera embodying this invention.

FIG. 6 is a partial cut-away view showing operation parts and parts in association therewith arranged as another embodiment of this invention. The same parts as those shown in FIG. 5 are indicated by the same reference numerals. The wiring substrate 20 is provided with wiring patterns 21a, 21b, and 21c. Two switches are formed, one by the combination of the patterns 21a and 21c, and the other by the combination of the patterns 21b and 21c. A slide button 22 slides in the directions of arrows with a contact piece 23 secured to the lower side thereof. When the slide button 22 is moved toward the shutter release button 8, a contact 23a of the contact piece 23 contacts the pattern 21a. The patterns 21a and 21c are then electrically interconnected via the contact piece 23. This causes the display of the liquid crystal device 130 to shift upward in the same manner as occurs when depressing the up-shift button 9a. Further, when the slide button 22 is moved in a direction opposite to the shutter release button 8, another contact 23b of the contact piece 23 contacts the pattern 21b to interconnect the patterns 21b and 21c via the contact piece 23. Then, like the case when one depresses the down-shift button 9b, the display of the liquid display device shifts downward.

In this embodiment, the up-shift and down-shift buttons 9a and 9b or the slide button 22 are arranged laterally in line with the shutter release button 8 on the side of the film winding lever 6 on the upper side of the camera. Therefore, in changing the shutter time value, the shifting button 9a or 9b or the slide button 22 can be easily operated without changing a ready-for-shooting condition with the index finger of the right hand kept at the shutter release button 8. Further, since the display device is disposed behind these operating parts, the display of the display device is never hidden but is left visible during an operation of the operating parts. Further, the display area of the display device tends to become larger in the event of plural display arrangement. However, with the embodiment arranged as shown in FIG. 3, the display can be made in a sufficient size within the limited space on the upper part of the camera.

Further, according to the arrangement of this embodiment, the shift-buttons 9a and 9b, the photographic mode selection button 11 and the film sensitivity value setting button 12 are divided and allocated on both sides of the protruding part provided for a view finder optical system, or a pentagonal prism. In setting photographic information, the photographic mode selection button 11 (or the film sensitivity value selection button 12) and the shift-buttons 9a or 9b are arranged to be simultaneously depressed. Therefore, since the protruding pentagonal prism part is located in between these operation buttons, the possibility of the two buttons being accidentally operated at the same time by hand or body or something else while the camera is being carried by the photographer is almost eliminated. The arrangement of the embodiment thus ensures safety like the lock device of a dial type operation arrangement. It is another advantage of the embodiment that, as shown in FIG. 3, the display segments a to 2 are arranged to show figures for both the film sensitivity value and the shutter time value, so that the display device can be arranged to have a small display area. The embodiment can be easily arranged to have a shutter speed and an aperture value set by simultaneously depressing two buttons. However, since the shutter speed and the aperture value are normally to be confirmed for every shot, this embodiment is arranged to have a single button depressed for setting these values by switching one to the other with importance set on improvement in operability of the camera. This specific embodiment is arranged to have the up-shift or down-shift buttons 9a to 9b operated concurrently with the film sensitivity value selection button 12 in setting the film sensitivity value, for example. However, this invention is not limited to such arrangement. In accordance with this invention, two information setting buttons having the same function may be disposed with the pentagonal prism part 1 interposed in between them and may be arranged to have the photographic information set by simultaneously depressing the two buttons.

In accordance with this invention, a number of information setting buttons are laterally aligned on the upper surface of a camera close to a photo-taking lens with a display device arranged behind them as previously described. The information setting buttons are in positions to be readily operable with the fingers of the photographer. The display device is disposed in a position which is not readily reached by the fingers. The invention thus facilitates photographic information setting operations on the camera. In accordance with this invention, two information setting buttons must be simultaneously operated for setting one kind of photographic information. The two buttons are disposed, one on one side of and the other on the other side of a part protruding from the upper surface of the camera for housing a view finder optical system therein. The invented arrangement minimizes the possibility of accidental and unintentional information setting. It is another advantage of the invention that preference means or preference effecting arrangement offers an information setting priority to an information setting operation to be accomplished by the information setting button located in a position less readily operable than the other information setting button when at least two of the information setting buttons are simultaneously operated. Therefore, when a finger of the photographer inadvertently touches a wrong button concurrently with a correct one, this arrangement effectively prevents an erroneous setting operation from being carried out, so that the photographer can accomplish a photographic information setting operation as desired even on such occasions.

A further advantage of the invention is that the information setting buttons are disposed on the outside of the camera body in a position to have the index finger of the photographer naturally rest there when he or she holds the camera for photography while a light measurement start button is located in a position to have another finger rest there. Hence, a photographic information setting operation can be easily accomplished with the index finger while the light measurement start button is operated at the same time with a finger other than the index finger.

What is claimed is:
1. A camera comprising:
   (a) a protruding part formed on the upper surface of the camera having a view finder optical system formed in the protruding part; and
   (b) operation means for permitting change of a photographic information, said operation means including:
   (b-1) a first operation switch arranged on one side of said protruding part;
   (b-2) a second operation switch arranged on the other side of said protruding part;
   (b-3) selecting means for selecting a particular one from a plurality of changeable photographic informations in a changeable condition in response to a switching operation of said first operation switch; and
   (b-4) changing means for changing the value of said plurality of photographic informations in response to a switching operation of said second operation switch, said changing means changing the value of said one particular photographic information selected by said switching operation of said first operation switch in response to said switching operation of said second operation switch.

2. A camera according to claim 1, wherein said protruding part on the upper surface of the camera has the optical path of a view finder image formed therein.

3. A camera according to claim 1, wherein said protruding part on the upper surface of the camera has a pentagonal prism disposed therein.

4. A camera according to claim 1, wherein at least said first operation switch is arranged to be a push button switch.

5. A camera according to claim 1, wherein said second operation switch is arranged to be a push button switch.

6. A camera according to claim 1, wherein said second operation switch has two push button switches, said push button switches including one push button switch for upchanging the value of said one particular photographic information and another push button switch for down-changing the value of said one particular photographic information.

7. A camera according to claim 1, wherein said second operation switch is arranged to be a slide switch.

8. A camera according to claim 1, further comprising display means for displaying a mark representing said selected particular one item of photographic information, and displaying the value of said item of photographic information numerically in response to the switching operation of said first operation switch, said display means being arranged on the upper surface of the camera on said other side on which said second operation switch is arranged.

9. A camera according to claim 1, wherein said plurality of photographic informations includes photographic information on exposure values.

10. A camera comprising:
    (a) a protruding part formed on the upper surface of the camera having a viewfinder optical system formed in said protruding part;
    (b) operation means for permitting change of a plurality of photographic informations, including:

(b-1) a first operation switch arranged on one side of said protruding part opposite the side on which a shutter release button is located;

(b-2) a second operation switch arranged on the side on which the shutter release button is located;

(b-3) selecting means for selecting a particular one from a plurality of changeable photographic informations in a changeable condition in response to a switching operation of said first operation switch; and (b-4) changing means for changing the value of said plurality of photographic informations in response to a switching operation of said second operation switch, said changing means changing the value of said one particular photographic information selected by said switching operation of said first operation switch in response to said switching operation of said second operation switch.

11. A camera according to claim 10, wherein said plurality of photographic informations includes photographic information on exposure values.

12. A camera comprising:
(a) a protruding part formed on the upper surface of the camera having a viewfinder optical system formed in said protruding part;
(b) operation means for permitting change of a photographic mode as a photographic information, including:
(b-1) a first operation switch arranged on one side of said protruding part;
(b-2) a second operation switch arranged on the other side of said protruding part;
(b-3) selecting means for selection of said photographic mode from a plurality of changeable photographic informations in a changeable condition in response to a switch operation of said first operation switch; and
(b-4) changing means for changing said plurality of photographic informations in response to a switching operation of said second operation switch, said changing means changing said photographic mode selected by said switch operation of said first operation switch in response to said switching operation of said second operation switch.

13. A camera according to claim 12, wherein said protruding part on the upper surface of the camera has the optical view of a view finder image formed therein.

14. A camera according to claim 13, wherein protruding part on the upper surface of the camera has a pentagonal prism disposed therein.

15. A camera according to claim 12, wherein at least said first operation switch is arranged to be a push button switch.

16. A camera according to claim 12, wherein at least said first operation is arranged to be a push button switch.

17. A camera according to claim 12, wherein said second operation switch is arranged to be a push button switch.

18. A camera according to claim 12, wherein said second operation switch has two push button switches, said push button switches including one push button switch for upchanging the value of said one particular photographic information, and another push button switch for down-changing the value of said one particular photographic information.

19. A camera according to claim 12, wherein said one particular item of photographic information is film sensitivity (ASA/ISO) information.

20. A camera according to claim 12, wherein said photographic mode includes a program mode, shutter preference mode, and diaphragm preference mode.

21. A camera according to claim 12, further comprising display means for displaying a mark representing said photographic mode, said display means being arranged on the upper surface of the camera on the other side on which said second operation switch is arranged.

22. A camera according to claim 12, wherein said plurality of photographic informations includes photographic information on exposure values.

23. A camera comprising:
(a) a protruding part formed on the upper surface of the camera having a view finder optical system formed in the protruding part; and
(b) operating means for permitting change of a photographic mode as photographic informations, including:
(b-1) a first operation switch arranged on one side of said protruding part opposite the side on which a shutter release button is located;
(b-2) a second operation switch arranged on the side on which the shutter release button is located;
(b-3) selecting means for selection of said photographic mode from a plurality of changeable photographic informations in a changeable condition in response to a switch operation of said first operation switch; and
(b-4) changing means for changing said plurality of photographic information in response to a switching operation of said second operation switch, said changing means changing said photographic mode selected by said switching operation of said second operation switch in response to a switching operation of said second operation switch.

24. A camera according to claim 23, wherein said plurality of photographic informations includes photographic information on exposure values.

25. A camera comprising:
(a) a protruding part formed on the upper surface of the camera having a view finder optical system formed in the protruding part;
(b) operation means for permitting change of an item of photographic information, including:
(b-1) a first operation switch arranged on one side of said protruding part, said first operation switch, when operated, generating a selecting signal, and when not operated, coming back to an initial position automatically to stop the generation of said selecting a signal;
(b-2) a second operation switch arranged on the other side of said protruding part;
(b-3) selecting means for selecting particular one photographic item of information in a changeable condition from a plurality of items of photographic information only while said selecting signal generated by the operation of said first operation switch is being applied; and
(b-4) changing means for changing the value of said particular one item of photographic information selected by the generating of said selecting signal in response to the operation of said second operation switch.

26. A camera comprising:

(a) a protruding part formed on the upper surface of the camera having a view finder optical system formed in the protruding part;
(b) operating means for permitting change of a photographic mode as photographic information, including:
(b-1) a first operation switch arranged on one side of said protruding part, said first operation switch, when operated, generating a selecting signal and, when not operated, coming back to an initial position automatically to stop the generating of said selecting signal;
(b-2) a second operation switch arranged on the other side of said protruding part;
(b-3) selecting means for selecting said photographic mode in a changeable condition from a plurality of modes of photographic information only while said selecting signal generated by the operation of said first operation switch is being applied; and
(b-4) changing means for changing said photographic mode selected in a changeable condition by the generation of said selecting signal in response to the operation of said second operation switch.

27. A camera comprising:
(a) a protruding part formed on the upper surface of the camera having a view finder optical system formed in the protruding part;
(b) operation means for permitting change of a plurality of photographic informations:
(b-1) a first operation switch arranged on one side of said protruding part;
(b-2) a second operation switch arranged on the other side of said protruding part;
(b-3) a third operation switch arranged on said one side of said protruding part;
(b-4) first selecting means for selecting a first photographic information from said plurality of photographic informations in a changeable condition in response to a switching operation of said first operation switch;
(b-5) second selecting means for selecting a second photographic information from said plurality of photographic informations in a changeable condition in response to a switching operation of said third operation switch; and
(b-6) changing means for changing said first photographic information selected by said switching operation of said first operation switch in response to a switching operation of said second operation switch, said changing means changing said second photographic information selected by said switching operation of said third operation switch in response to a switching operation of said second operation switch.

28. A camera according to claim 27, wherein said first photographic information is a numerical information and said second photographic information is a photographic mode.

29. A camera according to claim 28, wherein said first photographic information is concerned with film sensitivity.

30. A camera comprising:
(a) a first operation switch arranged on one longitudinal side of the upper surface of the camera;
(b) second operation switch arranged on another longitudinal side of said upper surface of the camera;
(c) selecting means for selecting a particular one from a plurality of items of photographic information in a changeable condition in response to a switching operation of said first operation switch; and
(d) changing means for changing the value of said one particular item of photographic information selected by said switching operation of said first operation switch in response to a switching operation of said second operation switch.

31. A camera comprising:
(a) a first operation switch arranged on one longitudinal side of the upper surface of the camera;
(b) second operation switch arranged on another longitudinal side of said upper surface of the camera;
(c) selecting means for selecting a photographic mode in a changeable condition from a plurality of photographic data in response to the switching operation of said first operation switch; and
(d) changing means for changing said photographic mode in response to the switching operation of said second operation switch.

* * * * *